United States Patent
Koizumi (10) Patent No.: US 10,234,337 B2
(45) Date of Patent: Mar. 19, 2019

(54) MEASUREMENT APPARATUS AND MEASUREMENT METHOD

(71) Applicant: Oki Electric Industry Co., Ltd., Tokyo (JP)

(72) Inventor: Kengo Koizumi, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 184 days.

(21) Appl. No.: 15/403,433

(22) Filed: Jan. 11, 2017

(65) Prior Publication Data

US 2017/0254708 A1 Sep. 7, 2017

(30) Foreign Application Priority Data

Mar. 4, 2016 (JP) .................................. 2016-041719

(51) Int. Cl.
*G01K 11/32* (2006.01)
*G01K 13/00* (2006.01)
(Continued)

(52) U.S. Cl.
CPC ........... *G01K 11/3206* (2013.01); *G01D 5/28* (2013.01); *G01D 5/35364* (2013.01); *G01K 11/32* (2013.01); *G01K 2011/322* (2013.01)

(58) Field of Classification Search
CPC ..... G01N 2021/638; G01N 2021/4709; G01N 2021/6463; G01N 2021/6484;
(Continued)

(56) References Cited

U.S. PATENT DOCUMENTS 6,237,421 B1   5/2001 Li et al.
9,377,290 B2 * 6/2016 Yun ..................... A61B 5/0059
(Continued)

FOREIGN PATENT DOCUMENTS

JP          4279834 A    10/1992
JP     2000-074697 A     3/2000
JP     2001-165808 A     6/2001

OTHER PUBLICATIONS

Kengo Koizumi & Hitoshi Murai, Characterization of distributed temperature measurement using SDH-BOTDR, Proceedings of the IEICE General Conference 2016, Japan, The Institute of Electronics, Information and Communication Engineers, Mar. 1, 2016, p. 430.

(Continued)

*Primary Examiner* — Gail Kaplan Verbitsky
(74) *Attorney, Agent, or Firm* — Rabin & Berdo, P.C.

(57) ABSTRACT

The light source unit generates probe light. The splitting unit splits Brillouin backscattered light, which arise in the optical fiber under test owing to the probe light, into two branches of a first light path and a second light path. The delay unit gives a delay between light propagating through the first light path and the second light path. The multiplexer unit multiplexes light propagating through the first light path and the second light path to generate multiplexed light. The coherent detection unit performs heterodyne detection on the multiplexed light to output a difference frequency as a first electrical signal. The frequency shift amount obtaining unit performs homodyne detection on one of the two branches split from the first electrical signal and the second electrical signal having the same frequency as the frequency of the first electrical signal to obtain a frequency shift amount. The signal intensity obtaining unit generates intensity information of the first electrical signal as an intensity signal. The (Continued)

signal processing unit obtains strain δε and a temperature change δT separately from the frequency shift amount and the intensity.

7 Claims, 10 Drawing Sheets

(51) Int. Cl.
*G01D 5/28* (2006.01)
*G01D 5/353* (2006.01)

(58) Field of Classification Search
CPC ... G02B 23/2469; G02B 23/26; G01J 3/0218; G01J 3/02; G01K 11/32; G01K 2011/322; G01K 13/00; G01K 1/143; G01D 5/35335; G01D 5/35358
USPC ............ 374/142, 120, 121, 130, 161, 45, 46
See application file for complete search history.

(56) References Cited

U.S. PATENT DOCUMENTS

| | | | |
|---|---|---|---|
| 10,036,672 B2* | 7/2018 | Iwamura | G01K 11/32 |
| 2012/0067118 A1* | 3/2012 | Hartog | E21B 41/00 |
| | | | 73/152.16 |
| 2016/0290857 A1* | 10/2016 | Koizumi | G01K 11/32 |
| 2017/0059428 A1* | 3/2017 | Hill | G01K 11/32 |
| 2017/0108358 A1* | 4/2017 | Bastianini | G01D 5/35303 |
| 2018/0023948 A1* | 1/2018 | Bennett | G01B 11/255 |
| | | | 356/601 |
| 2018/0031414 A1* | 2/2018 | Farhadiroushan | |
| | | | G01D 5/35303 |
| 2018/0094987 A1* | 4/2018 | Iwamura | G01K 11/32 |

OTHER PUBLICATIONS

Yoshiyuki Sakairi, Haruyoshi Uchiyama, Zhi Xien Li & Shoji Adachi, System for measuring temperature and strain separately by BOTDR and OTDR, Proc. SPIE 4920, Advanced Sensor Systems and Applications, SPIE., Sep. 9, 2002, pp. 274 to 284.

T. Kurashima et al., "Brillouin Optical-Fiber Time Domain Reflectometry", IEICE Trans. Commun., vol. E76-B, No. 4, pp. 382-390, Apr. 1993.

T. R. Parker et al., "Simultaneous Distributed Measurement of Strain and Temperature from Noise-Initiated Brillouin Scattering in Optical Fibers", IEEE Journal of Quantum Electronics, vol. 34, No. 4, pp. 645-659, Apr. 1998.

Y. Sakairi et al., "A system for measuring temperature and strain separately by BOTDR and OTDR", Proceeding of SPIE, vol. 4920, pp. 274-284, 2002.

* cited by examiner

MEASUREMENT APPARATUS AND MEASUREMENT METHOD

CROSS REFERENCE TO RELATED APPLICATION(S)

This application is based upon and claims benefit of priority from Japanese Patent Application No. 2016-041719, filed on Mar. 4, 2016, the entire contents of which are incorporated herein by reference.

BACKGROUND

The present invention relates to an optical fiber strain and temperature measurement apparatus and an optical fiber strain and temperature measurement method using Brillouin scattered light.

With the evolution of optical fiber communications, distributed optical fiber sensing, in which the optical fiber itself serves as the sensing medium, has become an active area of research. Representative distributed optical fiber sensing is optical time domain reflectometry (OTDR), in which optical pulses are launched into an optical fiber from one end of the optical fiber, and light backscattered within the optical fiber is measured with respect to time. Backscattering in an optical fiber includes Rayleigh scattering, Brillouin scattering, and Raman scattering. Among others, OTDR that measures spontaneous Brillouin scattering is referred to as Brillouin OTDR (BOTDR) (see, for example, T. Kurashima et al., "Brillouin Optical-fiber time domain reflectometry", IEICE Trans. Commun., vol. E76-B, no. 4, pp. 382-390 (1993)).

Brillouin scattering can be observed at frequencies frequency-shifted on Stokes and anti-Stokes side with the frequency shift of the order of GHz with respect to the center frequency of the optical pulse launched into the optical fiber. The spectrum of Brillouin scattering is referred to as the Brillouin gain spectrum (BGS). The frequency shift and the spectral line width of the BGS are referred to as the Brillouin frequency shift (BFS) and the Brillouin line width, respectively. The BFS and the Brillouin line width vary depending on the material of the optical fiber and the wavelength of the incident light. For example, in the case of silica-based standard single-mode optical fiber, it is reported that, for an incident wavelength of 1.55 µm, the frequency shift amounts of the BFS and the Brillouin line width are approximately 11 GHz and approximately 30 MHz, respectively. Also, according to T. Kurashima et al., "Brillouin Optical-fiber time domain reflectometry", IEICE Trans. Commun., vol. E76-B, no. 4, pp. 382-390 (1993), the frequency shift amounts of the BFS associated with strain and a temperature change inside a single-mode fiber are 0.049 MHz/µε and 1.0 MHz/° C., respectively, for an incident wavelength of 1.55 µm.

Here, since the BFS has dependencies on strain and temperature, BOTDR has been attracting attention for the purpose of monitoring large constructions represented by bridges and tunnels, potential areas of landslide occurrence, or the like.

BOTDR generally performs heterodyne detection to measure spectrum waveform of spontaneous Brillouin scattered light arising in an optical fiber with the use of reference light prepared separately. The intensity of spontaneous Brillouin scattered light is lower than the intensity of Rayleigh scattering light by two through three orders of magnitude. Thus, heterodyne detection is useful in increasing the minimum light receiving sensitivity.

Figure 11:
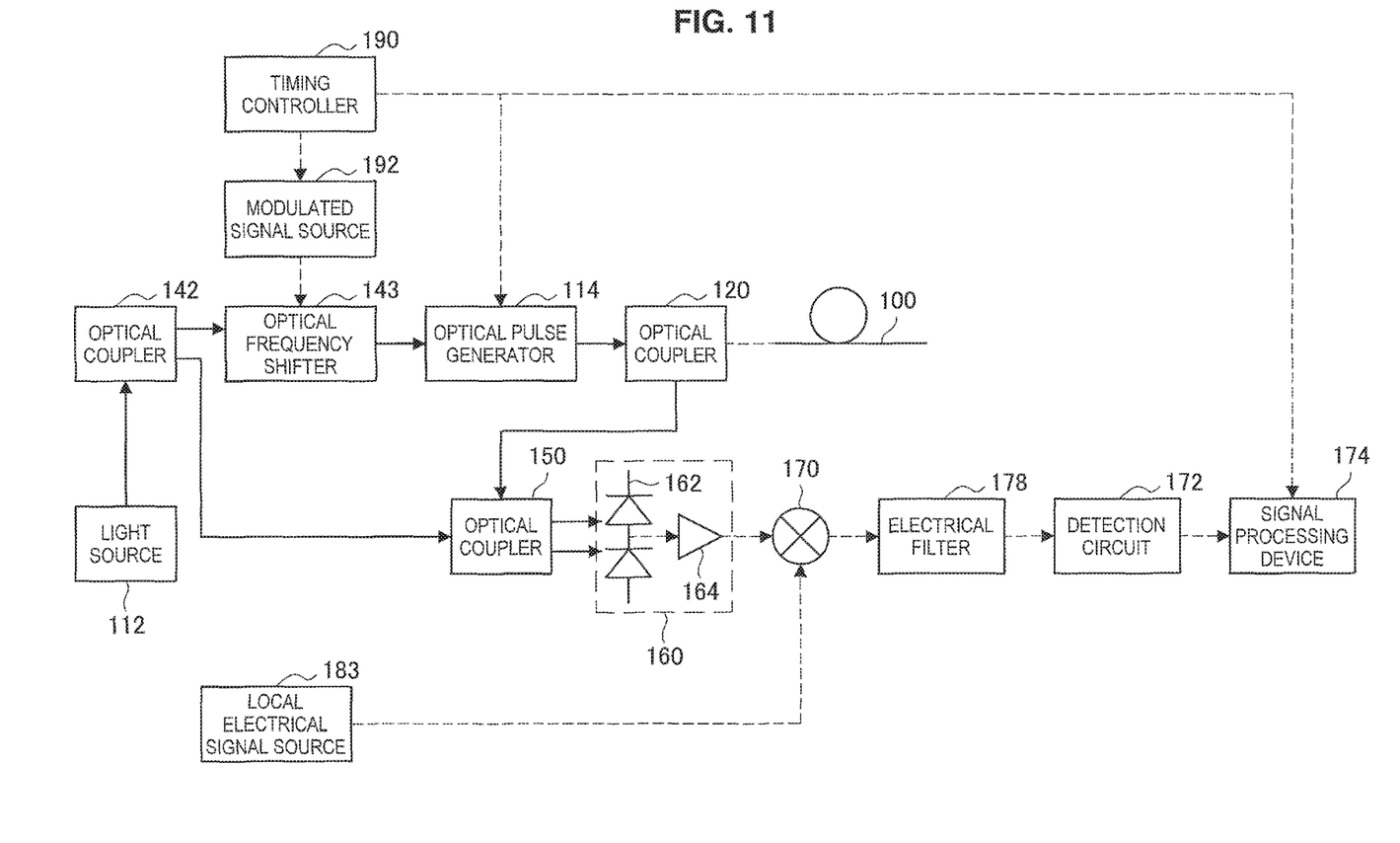
FIG. 11 is a schematic block diagram illustrating a conventional optical fiber strain measurement apparatus.

With reference to FIG. 11, conventional BOTDR (see, for example, JP 2001-165808A) is described below. FIG. 11 is a schematic block diagram illustrating the conventional optical fiber strain measurement apparatus.

Continuous light launched from a light source 112 is split into two branches by an optical coupler 142. One of the two branches is used as reference light, and the other is frequency-shifted by a frequency shift amount that corresponds to the Brillouin frequency by an optical frequency shifter 143 and then is converted into pulsed probe light by an optical pulse generator 114.

The probe light is launched into an optical fiber to be measured (optical fiber under test) 100 via an optical coupler 120. Brillouin backscattered light from the optical fiber under test 100 is multiplexed with the reference light at an optical coupler 150 and then is heterodyne detected by a receiver 160 which is composed of a balanced photodiode (PD) 162 and an FET amplifier 164.

Here, since the probe light is frequency-shifted as much as the Brillouin frequency shift by the optical frequency shifter 143, the frequency of the beat signal generated through the heterodyne detection is low. This allows the PD 162 and the PET amplifier 164 for low frequency bandwidth to be used at the receiving side. The beat signal is frequency-shifted down with a mixer 170 and an electrical filter 178, and then is square detected or envelope detected with a detection circuit 172, thereby providing intermediate frequency (IF) signal. The power or amplitude of the IF signal is measured to transmit the measured result to a signal processing device 174.

Figure 12:
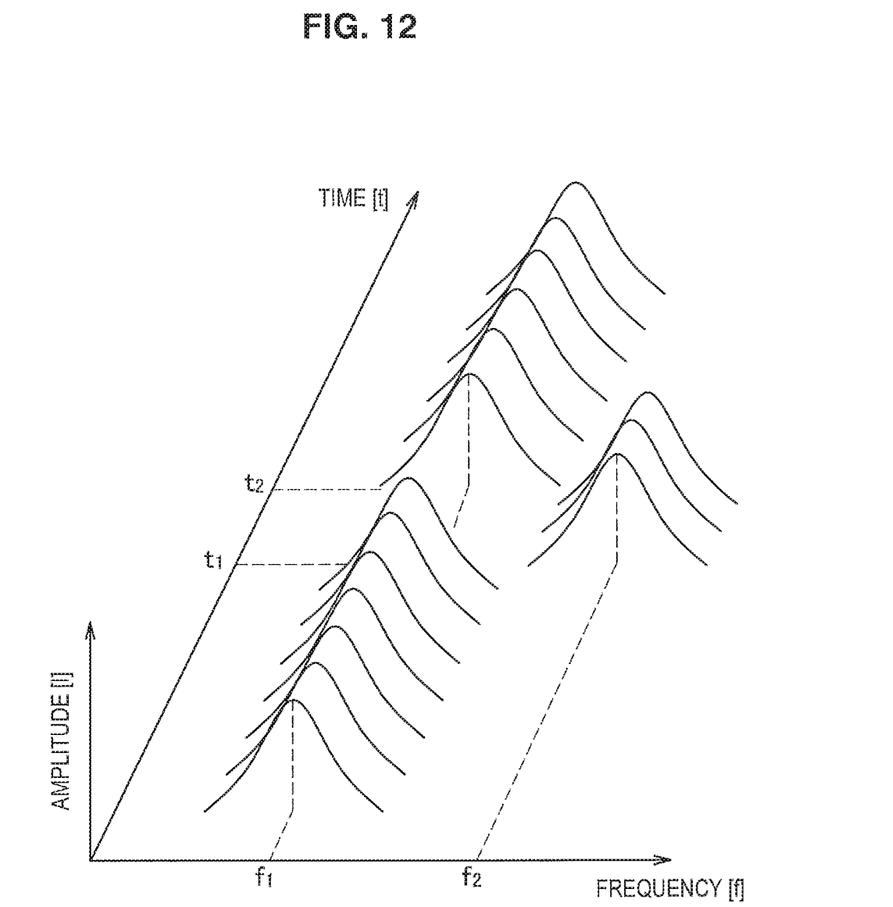
FIG. 12 is a schematic diagram for describing a method for obtaining three-dimensional information with axes of time, amplitude and frequency in a conventional optical fiber strain measurement apparatus.

Note that, since BOTDR deals with information on frequency spectrum distribution along the length of the optical fiber, it is necessary to obtain three-dimensional information with axes of time, amplitude and frequency. With reference to FIG. 12, a method for obtaining the three-dimensional information with axes of time, amplitude and frequency in BOTDR is described below. FIG. 12 is a schematic diagram for illustrating a method for obtaining the three-dimensional information with axes of time, amplitude and frequency in a conventional optical fiber strain measurement apparatus. In the technique disclosed in JP 2001-165808A described above, two-dimensional information with axes of time t and amplitude I is obtained by sweeping frequency f of a local electrical signal source 183 in order to measure the entire Brillouin frequency spectrum.

Here, not limited to BOTDR, in distributed optical fiber sensing using Brillouin scattering, both strain and a temperature change affect the BFS, as described above. Accordingly, it is essential to discriminate between strain and temperature effects. To achieve this object, a method is proposed that utilizes a coefficient of strain dependence and a coefficient of temperature dependence of a Brillouin backscatter coefficient in an optical fiber (see, for example, T. R. Parker et al., "Simultaneous distributed measurement of strain and temperature from noise-initiated Brillouin scattering in optical fibers", IEEE J. Quantum Electron., vol. 34, No. 4, pp. 645-659 (1998) or Y. Sakairi et al., "A system for measuring temperature and strain separately by BOTDR and OTDR", Proceeding of SPIE, vol. 4920, pp. 274-284 (2002)).

It is reported that the frequency shift and the scattering coefficient both have temperature and strain dependency in Brillouin backscatter. When the coefficient of strain dependence and the coefficient of temperature dependence of the BFS are $C_{v\varepsilon}$ and $C_{vT}$, respectively, and the coefficient of strain dependence and the coefficient of temperature dependence of the Brillouin scattering coefficient are $C_{P\varepsilon}$ and $C_{PT}$, respectively, strain and temperature effects can be separated by preliminarily measuring these coefficients and solving the following simultaneous equations (a) with two unknowns.

$$\delta v_B = C_{v\varepsilon}\delta\varepsilon + C_{vT}\delta T \quad (a)$$

$$100\frac{\delta P_B}{P_B} = C_{P\varepsilon}\delta\varepsilon + C_{PT}\delta T$$

In the equations, $\delta v_B$ is a frequency shift amount of the BFS, $\delta P_B/P_B$ is a relative amount of change of Brillouin scattering intensity. These $\delta v_B$ and $\delta P_B/P_B$ are values measured in BOTDR. Also, $\delta\varepsilon$ and $\delta T$ are amounts of strain and a temperature change, respectively.

SUMMARY

Here, even the application of heterodyne detection does not offer a sufficient signal-to-noise ratio (S/N) as spontaneous Brillouin scattered light is very weak. This leads to a necessity of an averaging process for S/N improvement. Due to the averaging process and the obtainment of the three-dimensional information described above, it is difficult for conventional optical fiber strain measurement apparatuses to shorten the measurement time.

In light of the foregoing problem, the inventor of the present invention has considered an optical fiber strain measurement apparatus and an optical fiber strain measurement method which use spontaneous Brillouin scattered light and in which changes in frequency of light are measured as phase differences of the beat signal given by coherent detection, thereby obtaining two-dimensional information with axes of time and phase, and has submitted a patent application (Japanese Patent Application No. 2015-072546, hereinafter referred to as "previous application") based on a part of the consideration results.

According to the optical fiber strain measurement apparatus and the optical fiber strain measurement method of the previous application, by using self-delayed heterodyne BOTDR (SDH-BOTDR) technique, changes in frequency of light are measured as phase differences of the beat signal given by coherent detection, thereby obtaining two-dimensional information with axes of time and phase. In this SDH-BOTDR, as no frequency sweep is required, measurement time is shortened as compared to the prior art which requires obtaining three-dimensional information.

However, in SDH-BOTDR, intensity changes associated with changes in the Brillouin scattering coefficient are captured as the phase differences in addition to the phase differences due to the BFS. In other words, in a frequency shift observed in SDH-BOTDR, changes due to strain and a temperature change of the Brillouin scattering coefficient in addition to the coefficient $C_{v\varepsilon}$ of strain dependence and the coefficient $C_{vT}$ of temperature dependence of the BFS are superimposed. Thus, it is impossible to obtain strain and a temperature change separately with a similar approach to the conventional BOTDR.

Accordingly, in light of the foregoing, in SDH-BOTDR, it is desirable to provide an optical fiber strain and temperature measurement apparatus and an optical fiber strain and temperature measurement method which are capable of obtaining strain and a temperature change separately.

An optical fiber strain and temperature measurement apparatus according to an embodiment of the present invention includes a light source unit, a splitting unit, an optical frequency shifter unit, a delay unit, a multiplexer unit, a coherent detection unit, an electrical signal generating unit, a frequency shift amount obtaining unit, a signal intensity obtaining unit, and a signal processing unit.

The light source unit generates probe light. The probe light is launched into an optical fiber to be measured (optical fiber under test). The splitting unit splits Brillouin backscattered light, which arise in the optical fiber under test owing to the probe light, into two branches of a first light path and a second light path. The optical frequency shifter unit is provided in any one of the first light path and the second light path and gives a frequency shift of beat frequency. The delay unit is provided in any one of the first light path and the second light path and gives a delay between light propagating through the first light path and the second light path. The multiplexer unit multiplexes light propagating through the first light path and the second light path to generate multiplexed light. The coherent detection unit performs heterodyne detection on the multiplexed light to output a difference frequency as a first electrical signal. The electrical signal generating unit generates a second electrical signal having the same frequency as the frequency of the first electrical signal. The frequency shift amount obtaining unit performs homodyne detection on one of the two branches split from the first electrical signal and the second electrical signal to obtain a frequency shift amount. The first electrical signal is what is called the beat signal. The signal intensity obtaining unit generates intensity information of the first electrical signal as an intensity signal. The signal processing unit obtains strain $\delta\varepsilon$ and a temperature change $\delta T$ separately from the frequency shift amount and the intensity.

Further, according to another preferred embodiment of the optical fiber strain and temperature measurement apparatus, the apparatus includes a first optical frequency shifter unit and a second optical frequency shifter unit, instead of the optical frequency shifter unit.

The first optical frequency shifter unit is provided in the first light path and gives a frequency shift of a first frequency. The second optical frequency shifter unit is provided in the second light path and gives a frequency shift of a second frequency. In this case, the second electrical signal is generated as a difference frequency between the first frequency and the second frequency and thus is what is called the beat signal.

According to a preferred embodiment of the optical fiber strain and temperature measurement apparatus, the signal processing unit obtains strain $\delta\varepsilon$ and a temperature change $\delta T$ in the optical fiber by solving the following simultaneous equations (1) with two unknowns with the frequency shift amount $\delta v_{SDH}$ and the intensity $\delta P_B/P_B$; and a coefficient $C_{v\varepsilon}$ of strain dependence and a coefficient $C_{vT}$ of temperature dependence of frequency shift of Brillouin backscatter, and a coefficient $C_{P\varepsilon}$ of strain dependence and a coefficient $C_{PT}$ of temperature dependence of a scattering coefficient of Brillouin backscatter in the optical fiber preliminarily obtained. The transmission loss in the optical fiber under test is, however, negligible.

$$\delta v_{SDH} = (C_{v\varepsilon}\delta\varepsilon + C_{vT}\delta T)\left(1 + \frac{C_{P\varepsilon}\delta\varepsilon + C_{PT}\delta T}{100}\right)^2 \quad (1)$$

$$100\frac{\delta P_B}{P_B} = C_{P\varepsilon}\delta\varepsilon + C_{PT}\delta T$$

An optical fiber strain and temperature measurement method according to an embodiment of the present invention includes:

generating probe light, the probe light being launched into an optical fiber under test;

splitting Brillouin backscattered light, which arise in the optical fiber under test owing to the probe light, into two branches of a first light path and a second light path;

giving a frequency shift of beat frequency to light which is propagating through any one of the first light path and the second light path;

giving a delay between light propagating through the first light path and the second light path;

multiplexing light propagating through the first light path and the second light path to generate multiplexed light;

performing heterodyne detection on the multiplexed light to generate a first electrical signal;

generating a second electrical signal having the same frequency as a frequency of the first electrical signal;

performing homodyne detection on one of the two branches split from the first electrical signal and the second electrical signal to obtain a frequency shift amount;

generating intensity information of the first electrical signal as an intensity signal; and obtaining strain $\delta\varepsilon$ and a temperature change $\delta T$ separately from the frequency shift amount and the intensity.

Further, according to another preferred embodiment of the optical fiber strain and temperature measurement method, the method includes: giving a frequency shift of a first frequency to the light propagating through the first light path; and giving a frequency shift of a second frequency to the light propagating through the second light path.

In implementations of the optical fiber strain and temperature measurement method, preferably, strain $\delta\varepsilon$ and a temperature change $\delta T$ are obtained by solving the simultaneous equations (1) with two unknowns described above with the frequency shift amount $\delta v_{SDH}$ and the intensity $\delta P_B/P_B$; and a coefficient $C_{v\varepsilon}$ of strain dependence and a coefficient $C_{vT}$ of temperature dependence of frequency shift of Brillouin backscatter, and a coefficient $C_{P\varepsilon}$ of strain dependence and a coefficient $C_{PT}$ of temperature dependence of a scattering coefficient of Brillouin backscatter in the optical fiber preliminarily obtained.

According to the optical fiber strain and temperature measurement apparatus and the optical fiber strain and temperature measurement method of the present invention, changes in frequency of light are measured as phase differences of the beat signal given by coherent detection, thereby obtaining two-dimensional information with axes of time and phase. Thus, the measurement time is shortened as compared to the prior art which requires obtaining three-dimensional information.

Also, the use of information on both phase differences and intensity of the beat signal enables strain $\delta\varepsilon$ and a temperature change $\delta T$ to be obtained.

DETAILED DESCRIPTION OF THE EMBODIMENT(S)

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

(Basic Configuration)

Figure 1:
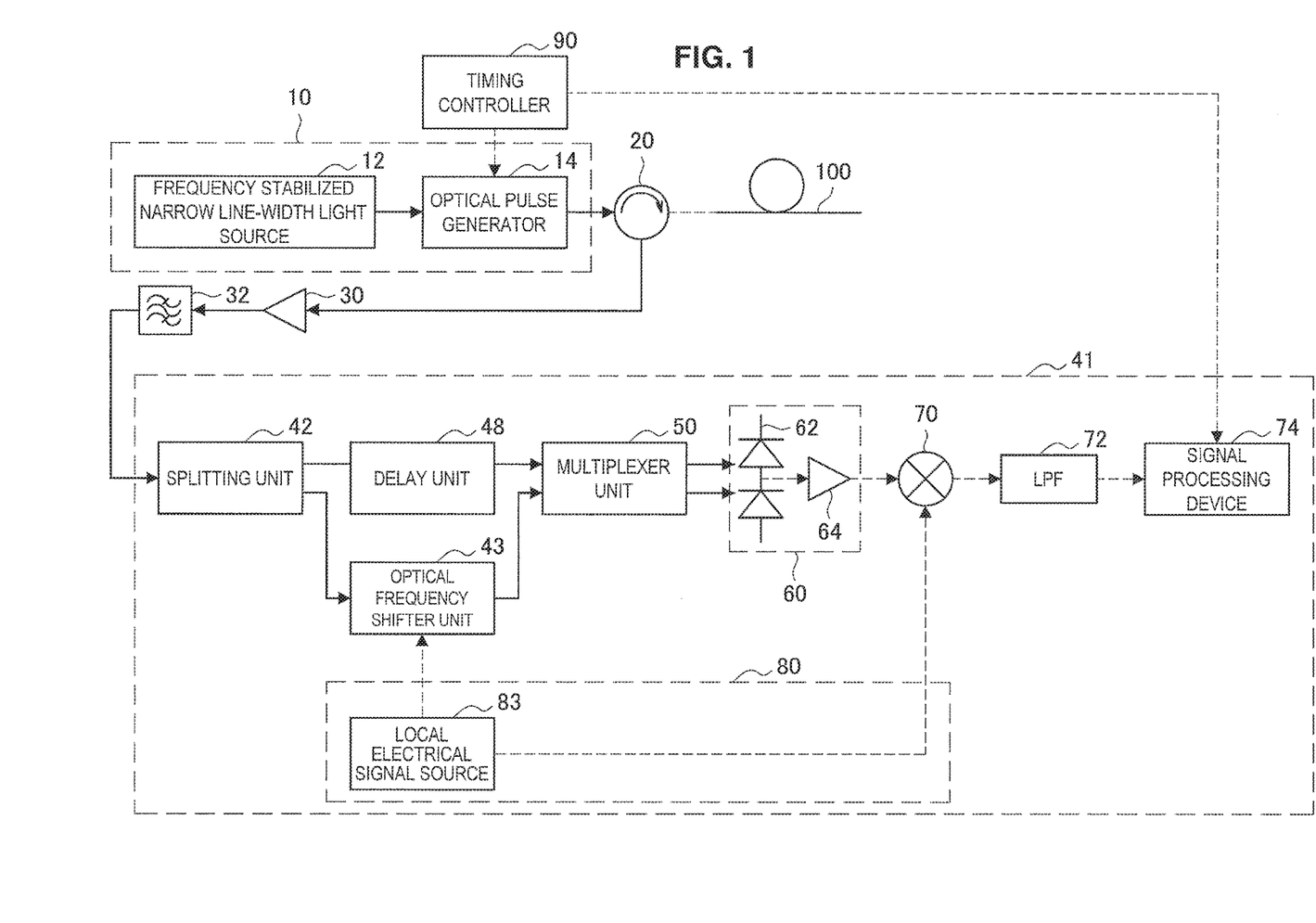
FIG. 1 is a schematic block diagram illustrating a basic configuration of an optical fiber strain measurement apparatus.

To facilitate the understanding of embodiments of the present invention, with reference to FIG. 1, a basic configuration of an optical fiber strain measurement apparatus in which changes in frequency of light are measured as phase differences of a beat signal given by coherent detection is described below. FIG. 1 is a schematic block diagram illustrating a basic configuration of an optical fiber strain measurement apparatus.

An optical fiber strain measurement apparatus has a light source unit 10, a circulator 20, an optical amplifier 30, an optical bandpass filter 32, a delayed self-heterodyne interferometer 41, and a timing controller 90.

The light source unit 10 generates probe light. The light source unit 10 has a light source 12 configured to generate continuous light and an optical pulse generator 14 configured to generate optical pulses from the continuous light.

Here, the optical fiber strain measurement apparatus in the basic configuration measures phase differences which corresponds to changes in frequency. Thus, a frequency fluctuation and a frequency spectral line width (hereinafter also simply referred to as line width) of the light source 12 need to be sufficiently smaller than the Brillouin shift. Thus, a frequency stabilized narrow line-width light source is used as the light source 12. For example, when an optical fiber to be measured (hereinafter also referred to as optical fiber under test) 100 has a strain of 0.008%, the corresponding Brillouin shift is 4 MHz. As such, in order to measure a strain of approximately 0.008%, it is preferable that the frequency fluctuation and the line width of the light source 12 is sufficiently smaller than 4 MHz, and more preferably, equal to or less than tens of kHz. Note that narrow line width lasers that have frequency fluctuation and line width nearly equal to or less than tens of kHz are commercially available as ready-made product.

The optical pulse generator 14 is configured with any suitable conventionally well-known acousto-optic (AO) modulator or electric optical (EO) modulator. The optical pulse generator 14 generates optical pulses from continuous light in response to electrical pulses generated at the timing controller 90. The repetition period of the optical pulses is set longer than the round trip time for an optical pulse along the optical fiber under test 100. The optical pulses are outputted as the probe light from the light source unit 10.

The probe light outputted from the light source unit 10 is launched into the optical fiber under test 100 via the circulator 20. Note that an optical coupler may be used instead of the circulator 20.

The backscattered light from the optical fiber under test 100 is transmitted to the optical amplifier 30 which is configured with, for example, an erbium-doped optical fiber amplifier (EDFA) via the circulator 20. The backscattered light amplified by the optical amplifier 30 is transmitted to the optical bandpass filter 32. The optical bandpass filter 32 has a passband of approximately 10 GHz and passes only spontaneous Brillouin scattered light. The spontaneous Brillouin scattered light is transmitted to the delayed self-heterodyne interferometer 41. A signal $E_0(t)$, at time t, of the spontaneous Brillouin scattered light launched from the optical bandpass filter 32 is represented by the following equation (2).

$$E_0(t)=A_0\eta_B(t)\exp\{j(2\pi f_B(t)t+\phi_0)\} \quad (2)$$

In the equation, $A_0$ is amplitude, $\eta_B(t)$ is a Brillouin scattering coefficient, $f_B(t)$ is an optical frequency of the Brillouin scattered light, and $\phi_0$ is an initial phase. Note that the Brillouin scattering coefficient $\eta_B(t)$ and the optical frequency $f_B(t)$ of the Brillouin scattered light change in response to local strain and a temperature change within the optical fiber and thus are functions of time t.

The delayed self-heterodyne interferometer 41 has a splitting unit 42, an optical frequency shifter unit 43, a delay unit 48, a multiplexer unit 50, a coherent detection unit 60, an electrical signal generating unit 80, and signal processing device 74.

A local electrical signal source 83 of the electrical signal generating unit 80 generates an electrical signal having a frequency $f_{AOM}$.

The splitting unit 42 receives, via the optical bandpass filter 32, and splits Brillouin backscattered light, which arises in the optical fiber under test 100 owing to the probe light, into the two branches of a first light path and a second light path.

The optical frequency shifter unit 43 is provided in the first light path. The optical frequency shifter unit 43 uses the electrical signal having the frequency $f_{AOM}$ generated by the local electrical signal source 83 to give a frequency shift of the frequency $f_{AOM}$ to the light propagating through the first light path.

In a conventional measurement apparatus, for example, disclosed in JP 2001-165808A, a frequency shift of tens of GHz which corresponds to the BFS is given. Meanwhile, in the optical fiber strain measurement apparatus according to embodiments of the present invention, the frequency $f_{AOM}$ ranges over tens of MHz. Thus, the frequency shifter can be compact and less expensive as compared to the conventional measurement apparatus.

Further, in this example configuration, the delay unit 48 is provided in the second light path. The delay unit 48 gives a delay of a time $\tau$ to light propagating through the second light path.

The multiplexer unit 50 multiplexes light propagating through the first light path and the second light path to generate multiplexed light. An optical signal $E_1(t)$ propagating through the first light path and an optical signal $E_2(t-\tau)$ propagating through the second light path to be launched into the multiplexer unit 50 are represented by the following equations (3) and (4), respectively.

$$E_1(t)=A_1\eta_B(t)\exp\{j(2\pi f_B(t)t+2\pi f_{AOM}t+\phi_1)\} \quad (3)$$

$$E_2(t-\tau)=A_2\eta_B(t)\exp[j\{2\pi f_B(t)(t-\tau)\phi_2\}] \quad (4)$$

In the equations, $A_1$ and $A_2$ are the amplitudes of $E_1(t)$ and $E_2(t-\tau)$, respectively; and $\phi_1$ and $\phi_2$ are, the initial phases of $E_1(t)$ and $E_2(t-\tau)$, respectively.

The coherent detection unit 60 performs heterodyne detection on the multiplexed light to generate the beat signal. The coherent detection unit 60 has, for example, a balanced photodiode (PD) 62 and an FET amplifier 64. A beat signal $I_{12}$ given by the heterodyne detection is represented by the following equation (5).

$$I_{12}=2A_1A_2\eta_B^2(t)\cos\{2\pi(f_{AOM}t+f_B(t)\tau)+\phi_1-\phi_2\} \quad (5)$$

The beat signal $I_{12}$ generated by the coherent detection unit 60 is transmitted to a mixer unit 70 as a first electrical signal. The electrical signal generated by the local electrical signal source 83 is transmitted to the mixer unit 70 as a second electrical signal.

The mixer unit 70 performs homodyne detection on the first electrical signal and the second electrical signal to generate a homodyne signal. The electrical signal $I_{AOM}$ generated by the local electrical signal source 83 is represented by the following equation (6).

$$I_{AOM}=A_{AOM}\cos(2\pi f_{AOM}t+\phi_{AOM}) \quad (6)$$

The homodyne signal generated by the mixer unit 70 is represented by the following equation (7), which is obtained by multiplying the equations (5) and (6).

$$I_{12}\times I_{AOM}=A_1A_2A_{AOM}\eta_B^2(t)\cos\{2\pi(2f_{AOM}t+f_B(t)\tau)+\phi_1-\phi_2+\phi_{AOM}\}+A_1A_2A_{AOM}\eta_B^2(t)\cos(2\pi f_B(t)\tau+\phi_1-\phi_2-\phi_{AOM}) \quad (7)$$

The sum frequency component in the equation (7) is eliminated by a low-pass filter (LPF) 72 to obtain a signal represented by the following equation (8).

$$I_{12}\times I_{AOM}=A_1A_2A_{AOM}\eta_B^2(t)\cos(2\pi f_B(t)\tau+\phi_1-\phi_2-\phi_{AOM}) \quad (8)$$

Since the terms $\phi_1-\phi_2-\phi_{AOM}$ in the equation (8) and the delay $\tau$ are constant, only the change in the Brillouin frequency $f_B(t)$ is outputted as the difference in the output intensity.

The Brillouin frequency $f_B(t)$ is changed by two factors, that is, fluctuation of oscillation frequency of the light source 12 and strain of the optical fiber under test 100. However, the use of the frequency stabilized narrow line-width light source as the light source 12 allows the effect of the strain of the optical fiber under test 100 to be dominant.

Figure 2:
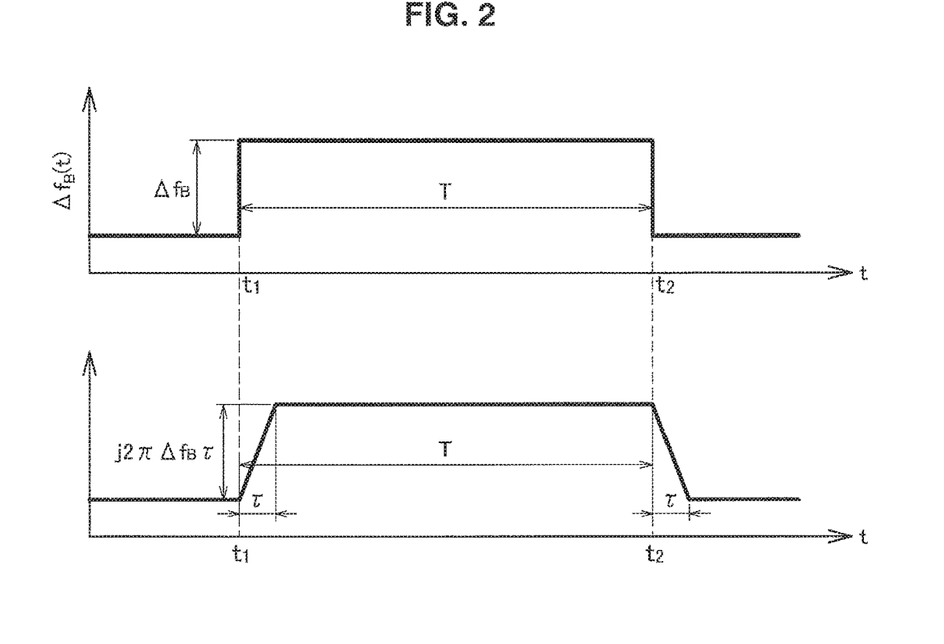
FIG. 2 is a schematic diagram illustrating a Brillouin shift and a phase change in a beat signal.

FIG. 2 is a schematic diagram illustrating a Brillouin shift and a phase change in a beat signal. (A) of FIG. 2 plots time t on the horizontal axis and a frequency on the vertical axis. (B) of FIG. 2 plots time t on the horizontal axis and voltage on the vertical axis.

The time on the horizontal axis indicates the position where the Brillouin scattering occurred. In other words, when Brillouin backscattered light is detected after the time t has elapsed from the time at which the probe light is launched, the position where the Brillouin backscatter occurred is at a distance vt/2 from the input end of the optical fiber under test, where v is propagation speed of light in the optical fiber under test.

FIG. 2 illustrates an example in which a frequency shift occurs in a time period T from time $t_1$ to $t_2$. Here, the phase changes during a time period from $t_1$ to $t_1+\tau$ and returns to the original state during a time period from $t_2$ to $t_2+\tau$, since the delayed self-heterodyne interferometer gives a delay $\tau$. In other words, it is necessary to satisfy the relationship $T \geq \tau$ in order to measure the phase difference by the optical fiber strain measurement apparatus, and $\tau$ determines the measurable temporal resolution (i.e., spatial resolution). Furthermore, $\tau$ also determines the measurable changes in frequency. That is, when the $\tau$ becomes longer, the measurable frequency range becomes narrower, but the spatial resolution becomes coarser. In contrast, when $\tau$ becomes shorter, the spatial resolution becomes finer, but the measurable frequency range becomes wider. Thus, there is a trade-off between the delay and the measurable frequency.

Figure 3:
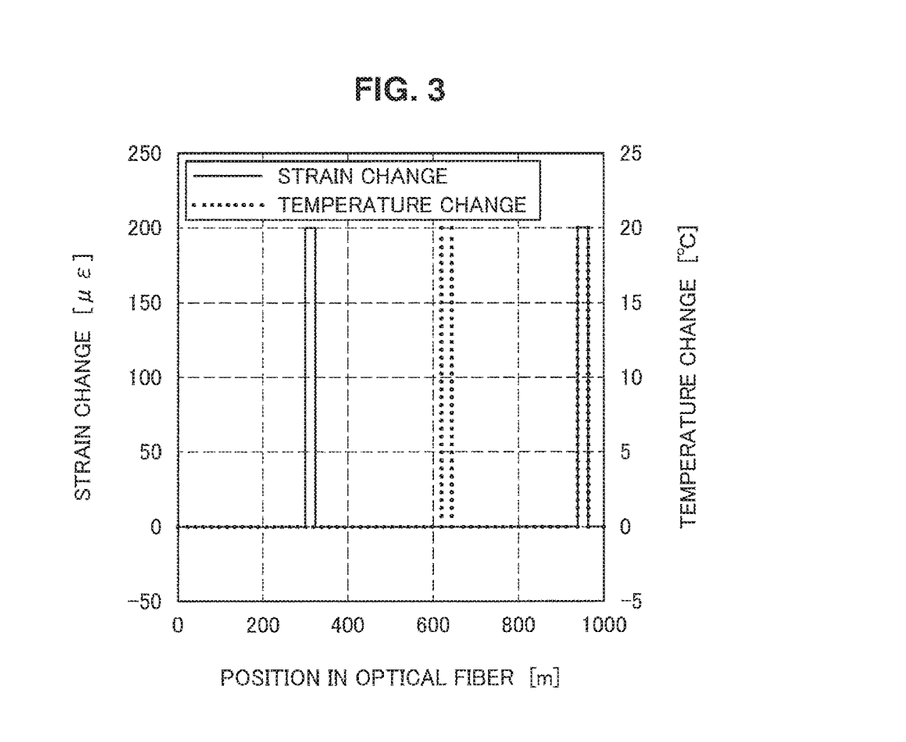
FIG. 3 is a graph illustrating a strain change and a temperature change given to an optical fiber.
Figure 4A:
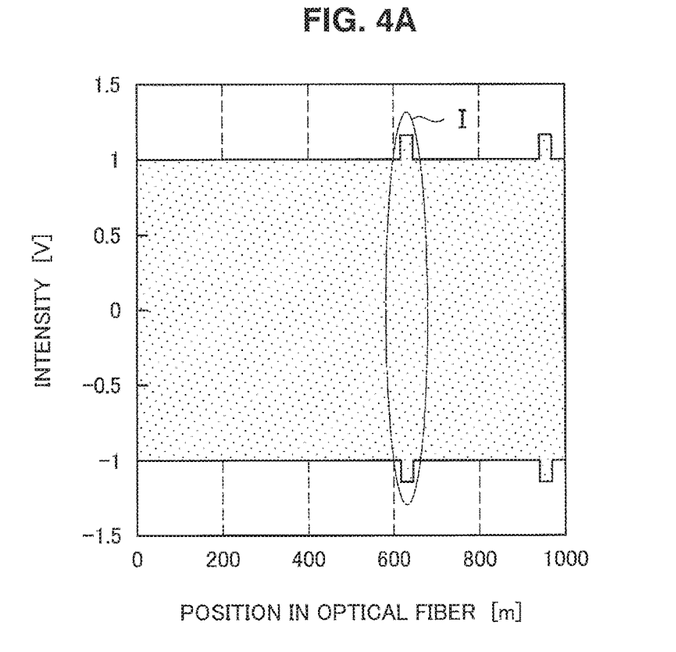
FIG. 4A is a graph illustrating a waveform of a beat signal obtained by an optical fiber strain measurement apparatus in a basic configuration.
Figure 4B:
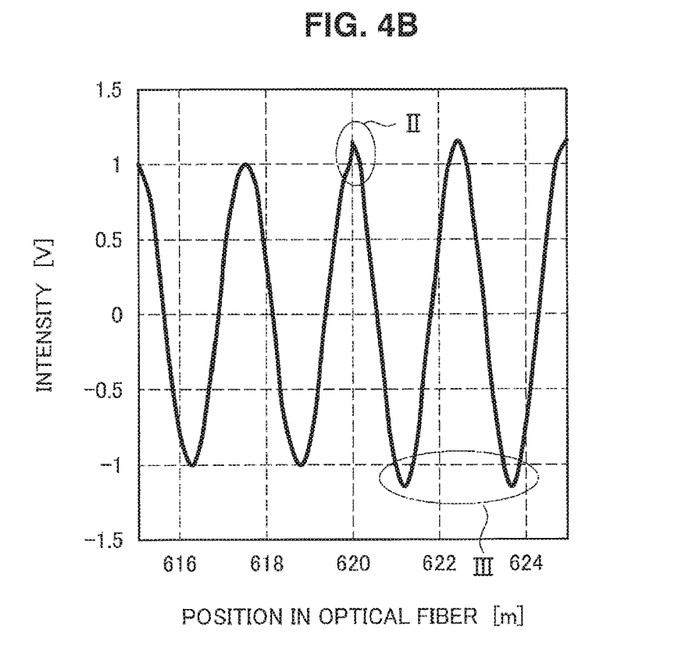
FIG. 4B is an enlarged view of a portion indicated by I in FIG. 4A.
Figure 5:
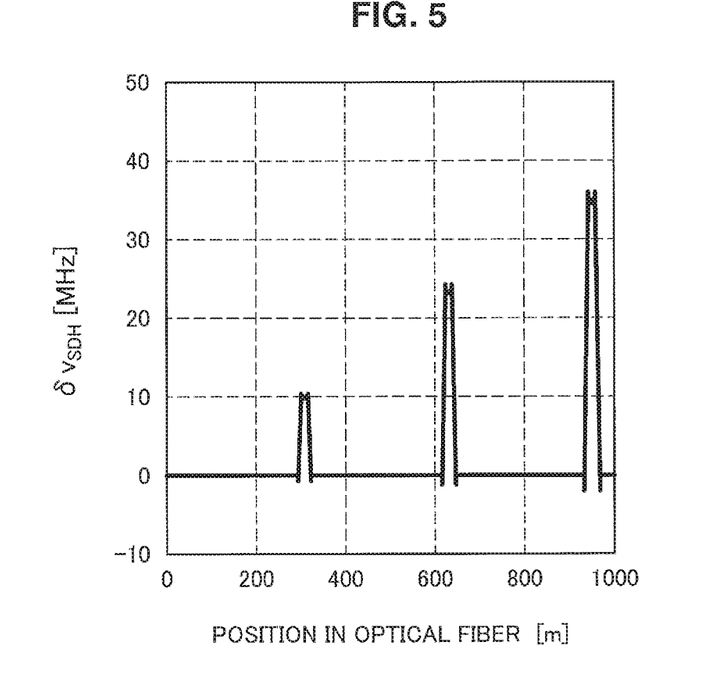
FIG. 5 is a graph illustrating a frequency shift amount obtained by performing homodyne detection and filtering on a beat signal.

With reference to FIGS. 3 to 5, a frequency shift obtained in SDH-BOTDR when strain and temperature of the optical fiber are changed is described below.

FIG. 3 is a graph illustrating a strain change and a temperature change given to an optical fiber. FIG. 3 plots a position in the optical fiber [m] on the horizontal axis and a strain change [µε] and a temperature change [° C.] on the vertical axis. The case will be considered here where the length of the optical fiber is 1 km, a strain of 200µε is given to sections at distances of 300 to 320 m and from 940 to 960 m from the end of the optical fiber strain measurement apparatus, and a temperature change of 20° C. is given to sections at distances of 620 to 640 m and 940 to 960 m.

FIGS. 4A and 4B are graphs illustrating the waveform of a beat signal obtained by an optical fiber strain measurement apparatus in the case described above. FIGS. 4A and 4B plot a position in the optical fiber [m] on the horizontal axis and signal intensity [V] on the vertical axis. FIG. 4B is an enlarged view of the portion indicated by I in FIG. 4A.

In the drawings, a coefficient $C_{v\epsilon}$ of strain dependence of BFS is 0.049 MHz/µε, a coefficient $C_{vT}$ of temperature dependence of the BFS is 1.0 MHz/° C. Also, a coefficient $C_{P\epsilon}$ of strain dependence of the Brillouin scattering coefficient is $-7.7 \times 10^{-4}$%/µε and a coefficient $C_{PT}$ of temperature dependence of the Brillouin scattering coefficient is 0.36%/° C.

As shown in FIG. 4B, a phase shift (portion indicated by II in FIG. 4B) due to the BFS and intensity changes (portion indicated by III in FIG. 4B) due to the Brillouin scattering coefficient occur at places where strain and a temperature change are given in the beat signal.

FIG. 5 is a graph illustrating a frequency shift amount $\delta v_{SDH}$ obtained by performing homodyne detection and filtering on the beat signal. FIG. 5 plots a position in the optical fiber [m] on the horizontal axis and the frequency shift amount $\delta v_{SDH}$ [MHz] on the vertical axis.

The frequency shift amount $\delta v_{SDH}$ is a value obtained by superimposing an intensity change due to a change in the Brillouin scattering coefficient to the frequency shift amount $\delta v_B$ given by the equations (1) described above, and represented by the following equation (9).

$$\delta v_{SDH} = (C_{v\epsilon}\delta\epsilon + C_{vT}\delta T)\left(1 + \frac{C_{P\epsilon}\delta\epsilon + C_{PT}\delta T}{100}\right)^2 \quad (9)$$

The optical fiber strain measurement apparatus in the basic configuration is configured to measure frequency changes of Brillouin scattering. Thus, it is difficult for the optical fiber strain measurement apparatus in the basic configuration to separate strain and a temperature change separately from the obtained information.

First Embodiment

Figure 6:
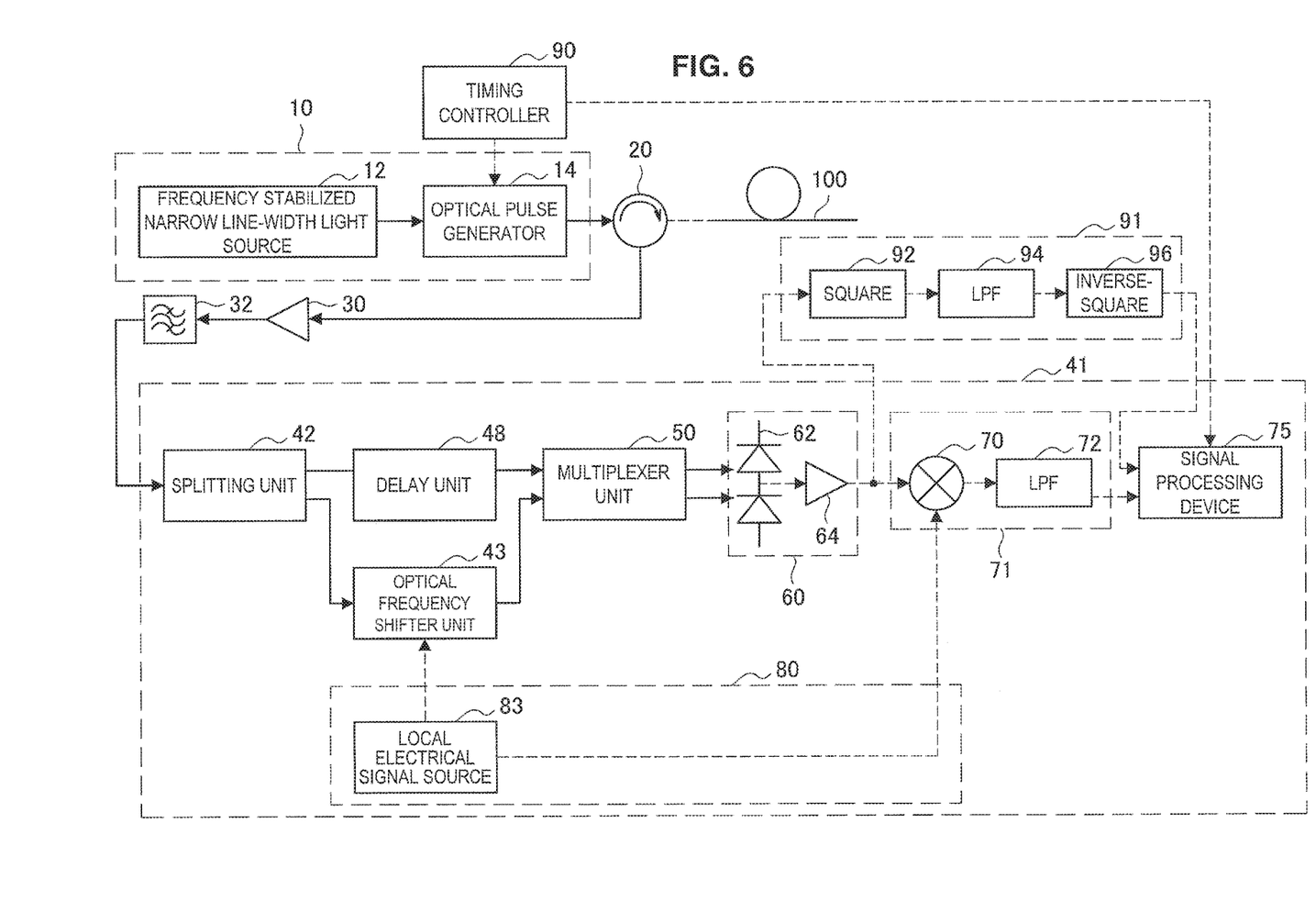
FIG. 6 is a schematic block diagram illustrating a first optical fiber strain and temperature measurement apparatus.

With reference to FIG. 6, an optical fiber strain and temperature measurement apparatus (hereinafter also referred to as first measurement apparatus) of a first embodiment is described below. FIG. 6 is a schematic block diagram illustrating a first measurement apparatus. Note that some explanation which overlaps with the explanation of the basic configuration of the optical fiber strain measurement apparatus is omitted in the following description.

The first measurement apparatus is different from the optical fiber strain measurement apparatus in the basic configuration in that the output of the coherent detection unit 60 is split into two branches, one of the two branches is transmitted to a signal processing device 75 via the mixer unit 70 and the LPF 72, and the other is transmitted to the signal processing device 75 via a square circuit 92, a low-pass filter (LPF) 94, and an inverse-square circuit 96.

The square circuit 92, the LPF 94, and the inverse-square circuit 96 are included in a signal intensity obtaining unit 91, and configured to implement an envelope detection function for the beat signal which is the output of the coherent detection unit 60. As a result, only intensity information of the beat signal is obtained when the beat signal passes through the square circuit 92, the LPF 94, and the inverse-square circuit 96 successively. In other words, $\delta P_B/P_B$ in the equations (1) described above can be obtained from the square circuit 92, the LPF 94, and the inverse-square circuit 96.

Figure 7:
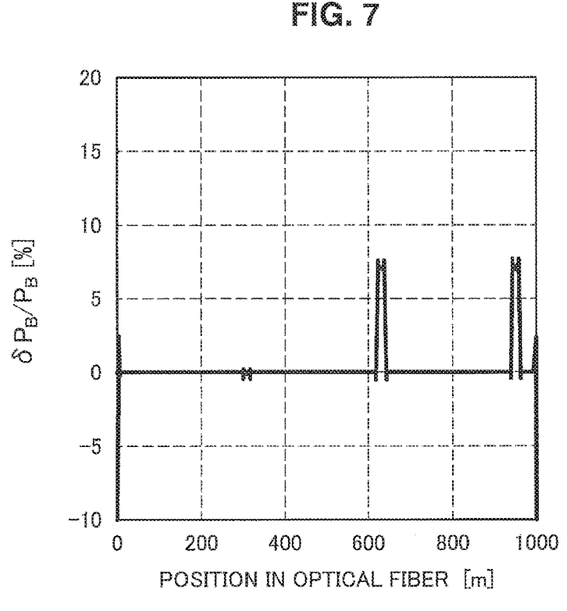
FIG. 7 is a graph showing $\delta P_B/P_B$.

FIG. 7 is a diagram showing $\delta P_B/P_B$ obtained by the envelope detection for the beat signal. FIG. 7 plots a position in the optical fiber [m] on the horizontal axis and $\delta P_B/P_B$ [%] on the vertical axis.

The mixer unit 70 and the LPF 72 are included in a frequency shift amount obtaining unit 71. The frequency shift amount obtaining unit 71 provides $\delta v_{SDH}$ in the equation (9) described above shown in FIG. 5.

The signal processing device 75 obtains $\delta E$ and $\delta T$ by solving the simultaneous equations (1) with two unknowns described above with $\delta v_{SDH}$ and $\delta P_B/P_B$ obtained from the beat signal and the coefficients preliminarily obtained.

By solving the simultaneous equations (1) with two unknowns, $\delta E$ and $\delta T$ are given by the following equations (10).

$$\delta\epsilon = \frac{C_{PT}\delta v_{SDH} - 100 C_{vT}\frac{\delta P_B}{P_B}\left(1 + \frac{\delta P_B}{P_B}\right)^2}{(C_{v\epsilon}C_{PT} - C_{vT}C_{P\epsilon})\left(1 + \frac{\delta P_B}{P_B}\right)^2} \quad (10)$$

$$\delta T = \frac{-C_{P\epsilon}\delta v_{SDH} + 100 C_{v\epsilon}\frac{\delta P_B}{P_B}\left(1 + \frac{\delta P_B}{P_B}\right)^2}{(C_{v\epsilon}C_{PT} - C_{vT}C_{P\epsilon})\left(1 + \frac{\delta P_B}{P_B}\right)^2}$$

The strain $\delta\epsilon$ and the temperature change $\delta T$ are obtained separately from the equations (10) with $Sv_{SDH}$ shown in FIG. 5 and $\delta P_B/P_B$ shown in FIG. 7.

Figure 8:
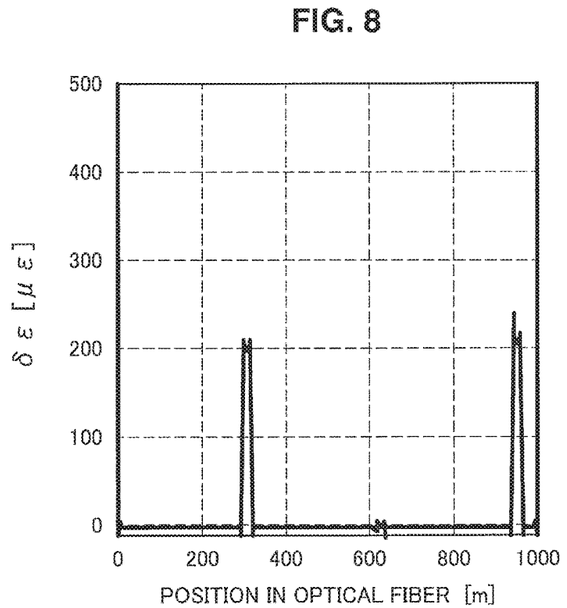
FIG. 8 is a graph showing separated SE.
Figure 9:
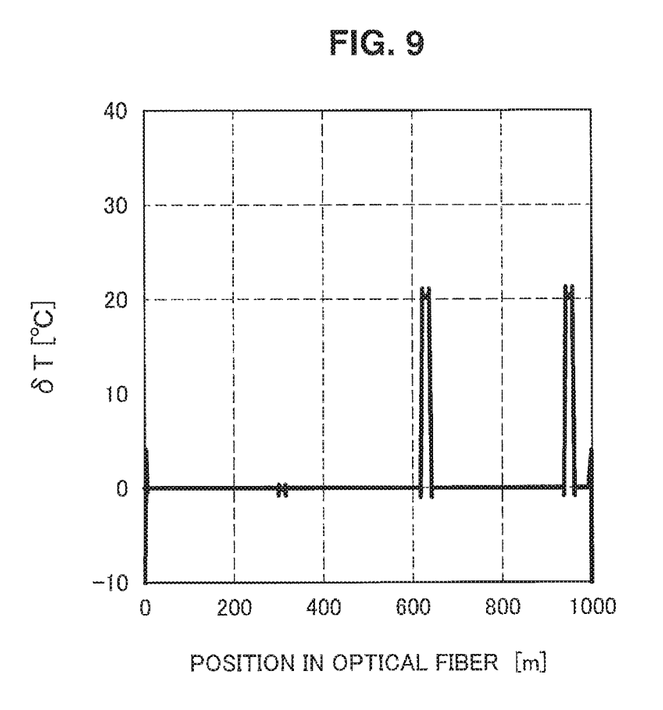
FIG. 9 is a graph showing separated $\delta T$.

FIG. 8 is a graph showing the separated δε. FIG. 8 plots a position in the optical fiber [m] on the horizontal axis and δε [με] on the vertical axis. FIG. 9 is a graph showing the separated δT. FIG. 9 plots a position in the optical fiber [m] on the horizontal axis and δT [° C.] on the vertical axis.

In this manner, δE and δT can be obtained separately according to the first measurement apparatus.

Second Embodiment

Figure 10:
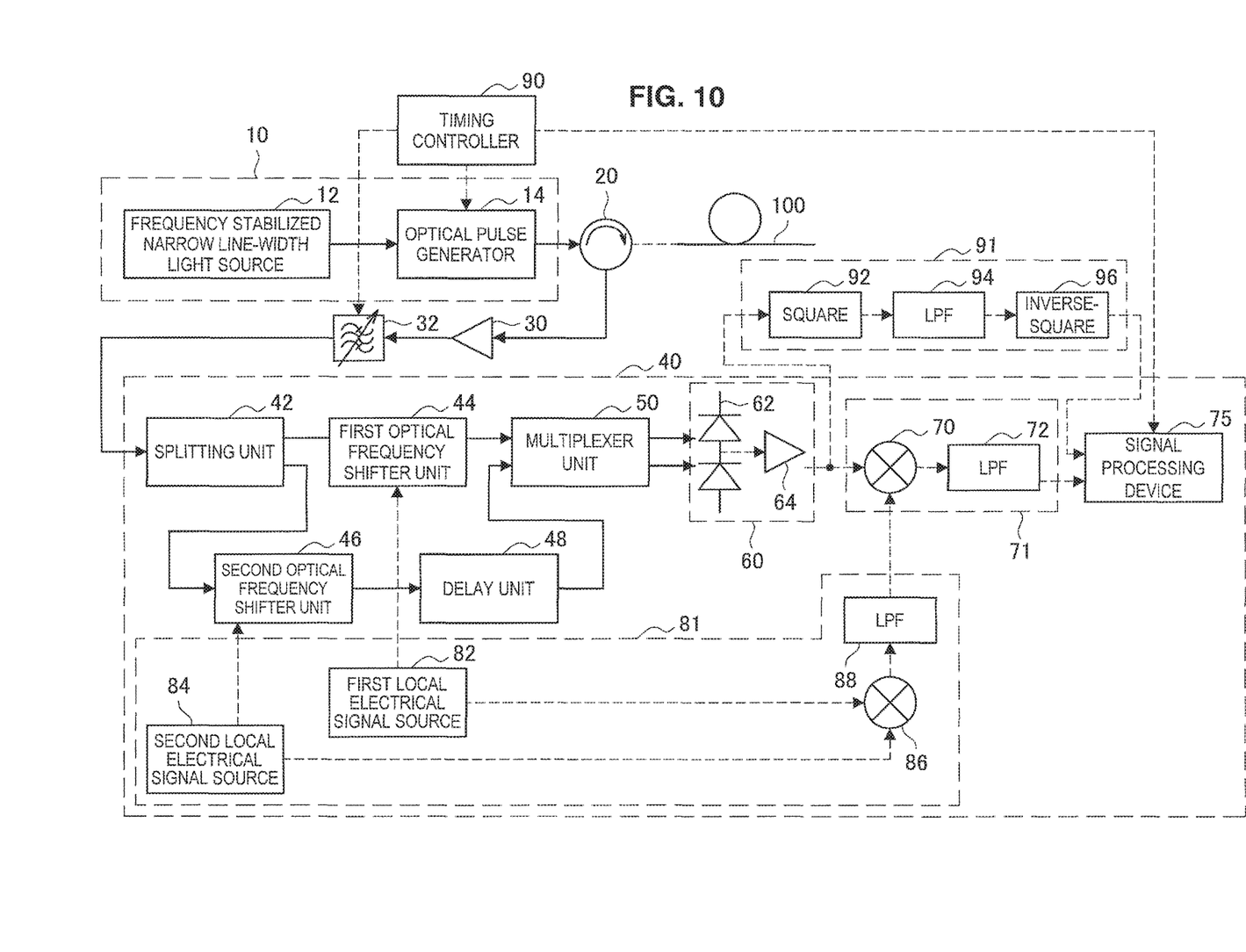
FIG. 10 is a schematic block diagram illustrating a second optical fiber strain and temperature measurement apparatus.

With reference to FIG. 10, an optical fiber strain and temperature measurement apparatus (hereinafter also referred to as second measurement apparatus) of a second embodiment is described below. The second measurement apparatus is provided with a first optical frequency shifter unit 44 in the first light path. The second measurement apparatus is also provided with a second optical frequency shifter unit 46 and a delay unit 48 in the second light path.

An electrical signal generating unit 81 has a first local electrical signal source 82, a second local electrical signal source 84, a mixer unit 86 and low-pass filter (LPF) 88. Note that the first local electrical signal source 82 and the second local electrical signal source 84 may be provided outside the electrical signal generating unit 81. The first local electrical signal source 82 generates an electrical signal of a first frequency $f_1$. The second local electrical signal source 84 generates an electrical signal of a second frequency $f_2$. The mixer unit 86 generates a sum frequency component and a difference frequency component of the first frequency $f_1$ and the second frequency $f_2$ from the electrical signal of the first frequency $f_1$ and the electrical signal of the second frequency $f_2$. The LPF 88 outputs the beat signal having a difference frequency component $f_{AOM}$ (=$f_1$−$f_2$) from a signal generated by the mixer unit 86.

The first optical frequency shifter unit 44 is provided in the first light path. The first optical frequency shifter unit 44 uses the electrical signal of the first frequency $f_1$ generated by the first local electrical signal source 82 to give a frequency shift of the first frequency $f_1$ to the light propagating through the first light path.

The second optical frequency shifter unit 46 is provided in the second light path. The second optical frequency shifter unit 46 uses the electrical signal of the second frequency $f_2$ generated by the second local electrical signal source 84 to give a frequency shift of the second frequency $f_2$ to the light propagating through the second light path.

The second measurement apparatus is different from the first measurement apparatus in that the delayed self-heterodyne interferometer 40 has optical frequency shifter units in both the first light path and the second light path, and the configuration of the electrical signal generating unit 81 is different. The other configuration is similar to that of the first measurement apparatus, so that repeated explanation is omitted.

The first measurement apparatus is advantageous in manufacturing cost as compared to the second measurement apparatus as the first measurement apparatus has only one optical frequency shifter unit and local electrical signal source. Meanwhile, the second measurement apparatus can perform more precise measurement in a sense that the second measurement apparatus performs homodyne detection, since frequency values of two lights multiplexed by the multiplexer unit are close.

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

What is claimed is:

1. A measurement apparatus comprising:
a light source unit configured to generate probe light;
a splitting unit configured to split Brillouin backscattered light into two branches of first light and second light, the Brillouin backscattered light arising owing to the probe light in a propagation medium which propagates light;
an optical frequency shifter unit provided in any one of a first light path configured to propagate the first light and a second light path configured to propagate the second light and configured to give a frequency shift of a beat frequency;
a delay unit provided in any one of the first light path and the second light path;
a multiplexer unit configured to multiplex light propagating through the first light path and the second light path to generate multiplexed light;
a coherent detection unit configured to perform heterodyne detection on the multiplexed light to output a difference frequency as a first electrical signal;
an electrical signal generating unit configured to generate a second electrical signal having the same frequency as a frequency of the first electrical signal;
a frequency shift amount obtaining unit configured to perform homodyne detection on the first electrical signal and the second electrical signal to obtain a frequency shift amount;
a signal intensity obtaining unit configured to generate intensity information of the first electrical signal as an intensity signal; and
a signal processing unit configured to calculate strain δε and a temperature change δT in the propagation medium, respectively, based on the frequency shift amount and the intensity, by using a predetermined equation.

2. A measurement apparatus comprising:
a light source unit configured to generate probe light;
a splitting unit configured to split Brillouin backscattered light into two branches of first light and second light, the Brillouin backscattered light arising owing to the probe light in a propagation medium which propagates light;
a first optical frequency shifter unit which is provided in the first light path configured to propagate the first light and configured to give a frequency shift of a first frequency;
a second optical frequency shifter unit which is provided in the second light path configured to propagate the second light and configured to give a frequency shift of a second frequency;
a delay unit provided in any one of the first light path and the second light path;
a multiplexer unit configured to multiplex light propagating through the first light path and the second light path to generate multiplexed light;
a coherent detection unit configured to perform heterodyne detection on the multiplexed light to output a difference frequency as a first electrical signal;
an electrical signal generating unit configured to generate a second electrical signal having the same frequency as a frequency of the first electrical signal;

a frequency shift amount obtaining unit configured to perform homodyne detection on the first electrical signal and the second electrical signal to obtain a frequency shift amount;

a signal intensity obtaining unit configured to generate intensity information of the first electrical signal as an intensity signal; and a signal processing unit configured to calculate strain $\delta\varepsilon$ and a temperature change $\delta T$ in the propagation medium, respectively, based on the frequency shift amount and the intensity, by using a predetermined equation.

3. The measurement apparatus according to claim 1, wherein to calculate strain $\delta\varepsilon$ and a temperature change $\delta T$ in the propagation medium, the signal processing unit solves following simultaneous equations (1) with two unknowns with a frequency shift amount $\delta v_{SDH}$ and intensity $\delta P_B/P_B$, and a coefficient $C_{v\varepsilon}$ of strain dependence and a coefficient $C_{vT}$ of temperature dependence of frequency shift of Brillouin backscatter, and a coefficient $C_{P\varepsilon}$ of strain dependence and a coefficient $C_{PT}$ of temperature dependence of a scattering coefficient of Brillouin backscatter in the propagation medium preliminarily obtained.

$$\delta v_{SDH} = (C_{v\varepsilon}\delta\varepsilon + C_{vT}\delta T)\left(1 + \frac{C_{P\varepsilon}\delta\varepsilon + C_{PT}\delta T}{100}\right)^2 \quad (1)$$

$$100\frac{\delta P_B}{P_B} = C_{P\varepsilon}\delta\varepsilon + C_{PT}\delta T.$$

4. A measurement apparatus comprising:
a light source configured to generate continuous light;
a probe light generator configured to generate probe light from the continuous light;
an optical fiber into which the probe light is launched;
a splitting unit which is connected directly or indirectly to the optical fiber on an input side and is connected to two split optical paths of a first light path and a second light path on an output side;
an optical frequency shifter unit provided in any one of the first light path and the second light path and configured to give a frequency shift of a beat frequency;
a delay unit provided in any one of the first light path and the second light path;
a multiplexer unit configured to multiplex light propagating through the first light path and the second light path to generate multiplexed light;
a coherent detection unit configured to perform heterodyne detection on the multiplexed light to output a difference frequency as a first electrical signal;
an electrical signal generating unit configured to generate a second electrical signal having the same frequency as a frequency of the first electrical signal;
a frequency shift amount obtaining unit configured to perform homodyne detection on the first electrical signal and the second electrical signal to obtain a frequency shift amount;
a signal intensity obtaining unit configured to generate intensity information of the first electrical signal as an intensity signal; and
a signal processing unit configured to calculate strain $\delta\varepsilon$ and a temperature change $\delta T$ in the optical fiber, respectively, based on the frequency shift amount and the intensity, by using a predetermined equation.

5. A measurement method comprising:
generating probe light;
deriving, after the probe light is launched into a propagation medium which propagates light, Brillouin backscattered light from the probe light in the propagation medium;
splitting the Brillouin backscattered light into two branches of a first light and a second light;
giving a frequency shift of a beat frequency to any one of the first light and the second light;
giving a delay to any one of the first light and the second light;
multiplexing the first light and the second light to generate multiplexed light;
performing heterodyne detection on the multiplexed light to output a difference frequency as a first electrical signal;
generating a second electrical signal having the same frequency as a frequency of the first electrical signal;
performing homodyne detection on the first electrical signal and the second electrical signal to obtain a frequency shift amount;
generating intensity information of the first electrical signal as an intensity signal; and
calculating strain $\delta\varepsilon$ and a temperature change $\delta T$ in the propagation medium, respectively, based on the frequency shift amount and the intensity, by using a predetermined equation.

6. A measurement method comprising:
generating probe light;
deriving, after the probe light is launched into a propagation medium which propagates light, Brillouin backscattered light from the probe light in the propagation medium;
splitting the Brillouin backscattered light into two branches of first light and second light;
giving a frequency shift of a first frequency to the first light;
giving a frequency shift of a second frequency to the second light;
giving a delay to any one of the first light and the second light;
multiplexing the first light and the second light to generate multiplexed light;
performing heterodyne detection on the multiplexed light to output a difference frequency as a first electrical signal;
generating a second electrical signal having the same frequency as a frequency of the first electrical signal;
performing homodyne detection on the first electrical signal and the second electrical signal to obtain a frequency shift amount;
generating intensity information of the first electrical signal as an intensity signal; and
calculating strain $\delta\varepsilon$ and a temperature change $\delta T$ in the propagation medium, respectively, based on the frequency shift amount and the intensity, by using a predetermined equation.

7. The measurement method according to claim 5, further comprising:
solving, to calculate strain $\delta\varepsilon$ and a temperature change $\delta T$ in the propagation medium, following simultaneous equations (1) with two unknowns with a frequency shift amount $\delta v_{SDH}$ and intensity $\delta P_B/P_B$, and a coefficient $C_{v\varepsilon}$ of strain dependence and a coefficient $C_{vT}$ of temperature dependence of frequency shift of Brillouin backscatter, and a coefficient $C_{P\varepsilon}$ of strain dependence and a coefficient $C_{PT}$ of temperature dependence of a scattering coefficient of Brillouin backscatter in the propagation medium preliminarily obtained $$\delta v_{SDH} = (C_{v\varepsilon}\delta\varepsilon + C_{vT}\delta T)\left(1 + \frac{C_{P\varepsilon}\delta\varepsilon + C_{PT}\delta T}{100}\right)^2 \quad (1)$$

$$100\frac{\delta P_B}{P_B} = C_{P\varepsilon}\delta\varepsilon + C_{PT}\delta T.$$

\* \* \* \* \*